United States Patent Office — 2,901,495 — Patented Aug. 25, 1959

2,901,495

ADDITION PRODUCTS OF FATTY ACIDS AND UNSATURATED NITRO COMPOUNDS

Howard M. Teeter, Morris J. Danzig, and John C. Cowan, Peoria, Ill., assignors to the United States of America as represented by the Secretary of Agriculture No Drawing. Application November 1, 1956
Serial No. 619,909

21 Claims. (Cl. 260—404)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to novel chemical compounds which have particular value as intermediates for the preparation of synthetic resins, plasticizers, and adhesives. In particular, the invention concerns addition products of nitroolefins and conjugated, long-chain poly-unsaturated fatty acids.

In accordance with the invention the aforesaid addition products, or adducts as they may be termed, are prepared by reaction of a nitroolefin with a long-chain, conjugated polyolefinic fatty acid. The reaction which takes place is illustrated by the equation below as specifically applied to β-nitrostyrene and 9,11-octadecadienoic acid, by way of example.

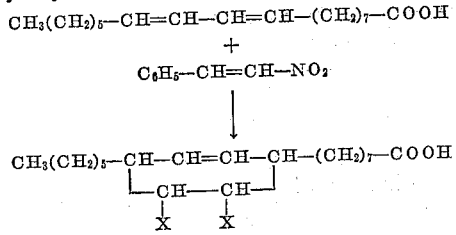

wherein one X is nitro ($NO_2$—), the other X is phenyl ($C_6H_5$—).

Where the fatty acid reactant is a different conjugated polyolefinic acid, the reaction will proceed in analogous manner, the alpha and beta carbon atoms of the nitroolefin attaching to the end carbon atoms in the conjugating grouping.

In general, the products of the invention derived from conjugated diolefinic acids may be described as compounds having at least 8 carbon atoms of the formula

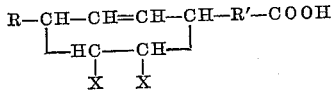

wherein R is hydrogen or alkyl, R' is alkylene and one X is nitro, the other X is a member of the group consisting of hydrogen and hydrocarbon radicals.

The products can be prepared from any compound in the category of long-chain, conjugated polyolefinic fatty acids. The critical feature in any case is the presence in the fatty acid of the conjugated system

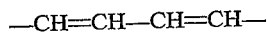

Preferred acids to be used in the process of the invention are 9,11-octadecadienoic acid and 10,12-octadecadienoic acid. Another preferred acid is conjugated linoleic acid which may be prepared in known manner from ordinary linoleic acid. Other suitable conjugated acids are those obtained by conjugating the fatty acids of soybean oil, safflower oil, sunflower oil, cottonseed oil, or other glyceride oil containing a high percentage of linoleic acid. Processes for producing conjugated fatty acids from such naturally-occurring fatty acids are well known in the art.

The nitroolefin reactant may be any compound of the formula

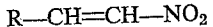

where R is hydrogen or hydrocarbon. In the hydrocarbon category, R may be alkyl, alkaryl, aryl, aralkyl or a cycloalkyl radical. Typical examples of such compounds are nitroethylene, 1-nitropropylene, 1-nitrobutene-1, 1-nitropentene-1, 1-nitro-3-methyl-pentene-1, 1-nitrohexene-1, 1-nitroheptene-1, 1-nitrooctene-1, β-nitrostyrene, 1-nitro-2-paratolylethene, 1-nitro-2-cyclohexylethene, 1-nitro-2-benzylethene, 1-nitro-2-(paraisopropylphenyl) ethene, and so forth. These reactants can be generically referred to as nitrohydrocarbons which contain the radical —$CH=CH-NO_2$.

The process of the invention essentially involves contacting the nitroolefin with the conjugated fatty acid. The temperature of reaction is not critical. Usually the temperature is at least 50° C. so that the reaction will take place at a practicable rate. On the other hand, the upper limit of temperature should be about 200° C. to minimize polymerization of the conjugated fatty acid. In general, a temperature around 130–150° C. is preferred. The two reactants are usually used in equimolar proportions, although it is preferred to employ an excess of the nitroolefin to ensure complete reaction. To assist in getting maximum contact between the reactants, it is preferred to employ a solvent. Some of the solvents which may be used are benzene, toluene, xylene, chloroform, heptane, mixtures of petroleum hydrocarbons and the like. It is obvious that other inert, volatile organic solvents can be employed. To enable the use of a temperature above the boiling point of the solvent, it is preferred to maintain the reaction mixture of nitroolefin, diolefinic acid and solvent in a sealed vessel capable of resisting the resulting super-atmospheric pressure. The reaction time will, of course, vary depending on the nature of the conjugated fatty acid and particularly on temperature. In many cases at a temperature of about 130° C.–150° C. the reaction will be complete in about 12–48 hours.

As noted above, the products of the invention are used for a wide variety of purposes. For example, the products may be reduced to convert the nitro group to an amine group. The resulting amino acids may be self-condensed to yield polyamides. These polyamides are useful for example in producing protective coatings on surfaces, as adhesives for paper, cellophane and other plastic films, for producing laminated structural materials such as glass fiber laminates, as cross-linking agents for use with epoxy resins, etc. An illustration of such use of the compounds of the invention is given in Example 3 below. Instead of self-condensing the amino acids they may be reacted with other polybasic carboxylic acids or polyamines to give useful polyamides having resinous charactertistics. Another application of the product of the invention involves esterification of the carboxyl group of the nitroadduct to yield nitroesters suitable for use as plasticizers. Plasticizers can also be prepared by esterifying the carboxyl group of the nitroadduct and reducing the nitro group to an amino group which is then acylated. More vigorous reduction of the nitroadducts yields saturated amino alcohols which are of value as intermediates in the synthesis of polyamides, plasticizers and adhesives.

The following examples illustrate the invention.

Example 1

A benzene solution containing 1.6 moles of nitroethylene and 1 mole of 9,11-octadecadienoic acid is refluxed for 48 hours. After purification of the reaction mixture, a solid product having a melting point of 85 to 90° is obtained in 44.5 percent yield. This product has the following analysis: carbon, 68.9; hydrogen, 9.88. The theoretical values for the adduct are: carbon, 67.89; hyrdogen, 9.98.

*Example 2*

A benzene solution containing 1 mole of β-nitrostyrene and 9,11-octadecadienoic acid is heated in a sealed tube at 110° C. for 90 hours. Purification of the reaction mixture gives a 27 percent yield of a liquid having the following analysis: carbon, 72.72; hydrogen, 9.24. The theoretical analysis for the desired adduct is: carbon, 72.69; hydrogen, 9.15.

*Example 3*

One and one-half grams of the product of Example 1 was dissolved in 30 ml. of ethanol. To this solution was added about 3 grams of Raney nickel catalyst and the mixture was subjected to hydrogen under a pressure of 40 lbs. per sq. in. The hydrogenation was conducted at room temperature for 1 hour. The resulting solution was filtered free from catalyst, concentrated and the saturated amino acid precipitated by addition of diethyl ether. The product was washed with diethyl ether and dried. The product obtained in a yield of 35 percent, had a melting point of 155–165° C., and was found to contain 4.04 percent nitrogen (theoretical 3.96 percent). The formula of the product is as follows:

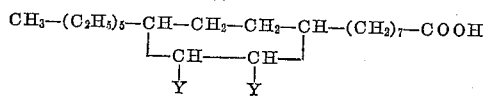

wherein one Y is amino (NH$_2$—) and the other is hydrogen.

A quantity of the above saturated amino acid was heated 40 minutes at 210° C. and under a pressure of 0.05 mm. to form a resin. Some of the resin was dissolved in tetrahydrofurane and the solution cast on a glass plate to form a resin coating. The coating was found to have a pencil hardness of 3H.

The saturated amino acid as described above is also suitable for preparing useful polymeric products in the manner as described in U.S. Patents Nos. 2,071,250, 2,071,253, and 2,440,516.

Having thus described the invention, we claim:

1. An adduct of a long-chain, conjugated polyolefinic monocarboxylic fatty acid having at least 8 carbon atoms and a compound having the radical —CH=CH—NO$_2$.
2. An adduct of beta-nitrostyrene and 9,11-octadecadienoic acid.
3. An adduct of beta-nitrostyrene and 10,12-octadecadienoic acid.
4. An adduct of beta-nitrostyrene and conjugated linoleic acid.
5. An adduct of beta-nitrostyrene and conjugated soybean fatty acids.
6. An adduct of nitroethylene and 9,11-octadecadienoic acid.
7. An adduct of nitroethylene and 10,12-octadecadienoic acid.
8. An adduct of nitroethylene and conjugated linoleic acid.
9. An adduct of nitroethylene and conjugated soybean fatty acids.
10. An adduct of a long-chain, conjugated diolefinic monocarboxylic fatty acid having at least 8 carbon atoms and a compound having the radical —CH=C—NO$_2$.
11. An adduct of a long-chain, conjugated diolefinic monocarboxylic fatty acid having at least 8 carbon atoms and nitroethylene.
12. An adduct of a long-chain, conjugated diolefinic monocarboxylic fatty acid having at least 8 carbon atoms and beta-nitrostyrene.
13. The compound of claim 10 wherein the fatty acid is a conjugated octadecadienoic acid.
14. The compound of claim 10 wherein the fatty acid is conjugated linoleic acid.
15. The compound of claim 10 wherein the fatty acid is conjugated soybean fatty acid.
16. The process which comprises reacting a long-chain, conjugated polyolefinic monocarboxylic fatty acid having at least 8 carbon atoms with a compound having the radical —CH=CH—NO$_2$ and recovering the resulting adduct.
17. The process which comprises reacting a long-chain, conjugated polyolefinic monocarboxylic fatty acid having at least 8 carbon atoms with nitroethylene and recovering the resulting adduct.
18. The process which comprises reacting a long-chain, conjugated polyolefinic monocarboxylic fatty acid having at least 8 carbon atoms with beta-nitrostyrene and recovering the resulting adduct.
19. The process of claim 16 wherein the fatty acid is a conjugated diolefinic fatty acid containing 18 carbon atoms.
20. The process of claim 16 wherein the fatty acid is conjugated linoleic acid.
21. The process of claim 16 wherein the fatty acid is conjugated soybean fatty acids.

References Cited in the file of this patent

Wrobel: Rocznike Chem. 25, 225–6 (1951) cited in Chemical Abst. 46, 6595h (1952).

Kataev et al.: Zuhr, Obschei Khim 23, 405–410 (1953), cited in Chemical Abst. 48, 3272e (1954).